(12) United States Patent
Yakovleva et al.

(10) Patent No.: US 11,462,721 B2
(45) Date of Patent: Oct. 4, 2022

(54) FINELY DEPOSITED LITHIUM METAL POWDER

(71) Applicant: FMC LITHIUM USA CORP., Philadelphia, PA (US)

(72) Inventors: Marina Yakovleva, Gastonia, NC (US); Yuan Gao, Greenwood Village, CO (US); Yangxing Li, Belmont, NC (US); Kenneth Brian Fitch, Cherryville, NC (US)

(73) Assignee: Livent USA Corp., Philadelphia, PA (US)

(*) Notice: Subject to any disclaimer, the term of this patent is extended or adjusted under 35 U.S.C. 154(b) by 350 days.

(21) Appl. No.: 16/423,843

(22) Filed: May 28, 2019

(65) Prior Publication Data

US 2019/0288271 A1 Sep. 19, 2019

Related U.S. Application Data

(63) Continuation of application No. 14/496,453, filed on Sep. 25, 2014, now abandoned, which is a continuation of application No. 12/954,988, filed on Nov. 29, 2010, now abandoned.

(60) Provisional application No. 61/266,308, filed on Dec. 3, 2009.

(51) Int. Cl.

| | |
|---|---|
| H01M 4/04 | (2006.01) |
| H01M 4/1395 | (2010.01) |
| H01M 4/134 | (2010.01) |
| H01M 4/1391 | (2010.01) |
| H01M 4/1393 | (2010.01) |
| C23C 10/30 | (2006.01) |
| C23C 26/00 | (2006.01) |

(52) U.S. Cl.
CPC .......... *H01M 4/0416* (2013.01); *C23C 10/30* (2013.01); *C23C 26/00* (2013.01); *H01M 4/0402* (2013.01); *H01M 4/043* (2013.01); *H01M 4/134* (2013.01); *H01M 4/1391* (2013.01); *H01M 4/1393* (2013.01); *H01M 4/1395* (2013.01)

(58) Field of Classification Search
None
See application file for complete search history.

(56) References Cited

U.S. PATENT DOCUMENTS

| | | | | |
|---|---|---|---|---|
| 5,589,300 A | * | 12/1996 | Fauteux | C01G 31/00 429/223 |
| 5,776,369 A | * | 7/1998 | Dover | B01J 13/0086 252/182.32 |
| 2005/0233066 A1 | * | 10/2005 | Sunagawa | C23C 24/04 427/58 |
| 2007/0218365 A1 | * | 9/2007 | Takezawa | H01M 4/0421 429/231.95 |
| 2008/0057385 A1 | * | 3/2008 | Aramata | H01M 2/145 429/129 |

FOREIGN PATENT DOCUMENTS

JP 08250113 A * 9/1996

OTHER PUBLICATIONS

European Examination Report, Application No. 19193920.6, dated Nov. 15, 2021, 5 pages.

* cited by examiner

*Primary Examiner* — Jose I Hernandez-Kenney
(74) *Attorney, Agent, or Firm* — Williams Mullen; F. Michael Sajovec, Esq.

(57) ABSTRACT

The present invention provides a method of finely depositing lithium metal powder or thin lithium foil onto a substrate while avoiding the use of a solvent. The method includes depositing lithium metal powder or thin lithium foil onto a carrier, contacting the carrier with a substrate having a higher affinity for the lithium metal powder as compared to the affinity of the carrier for the lithium metal powder, subjecting the substrate while in contact with the carrier to conditions sufficient to transfer the lithium metal powder or lithium foil deposited on the carrier to the substrate, and separating the carrier and substrate so as to maintain the lithium metal powder or lithium metal foil, deposited on the substrate.

1 Claim, 2 Drawing Sheets

FINELY DEPOSITED LITHIUM METAL POWDER

CROSS-REFERENCE TO RELATED APPLICATIONS

This application is a continuation application of U.S. application Ser. No. 14/496,453, filed Sep. 25, 2014, currently pending, which is a continuation of U.S. application Ser. No. 12/954,988, filed Nov. 29, 2010 and International Application PCT/US2010/058254 filed Nov. 30, 2010, both of which claims the benefit of U.S. Provisional Application Ser. No. 61/266,308, filed Dec. 3, 2009, the disclosures of which are incorporated herein by reference in their entirety.

FIELD AND BACKGROUND OF THE INVENTION

The present invention relates to a method of finely depositing lithium metal powder on a substrate. Such a finely deposited lithium metal powder may be used, for example, in forming an electrode for a primary or secondary battery.

Lithium and lithium-ion secondary or rechargeable batteries have found use in certain applications such as in cellular phones, camcorders, and laptop computers, and even more recently, in larger power applications such as in electric vehicles and hybrid electric vehicles. It is preferred in these applications that the secondary batteries have the highest specific capacity possible but still provide safe operating conditions and good cyclability so that the high specific capacity is maintained in subsequent recharging and discharging cycles.

Although there are various constructions for secondary batteries, each construction includes a positive electrode (or cathode), a negative electrode (or anode), a separator that separates the cathode and anode, and an electrolyte in electrochemical communication with the cathode and anode. For secondary lithium batteries, lithium ions are transferred from the anode to the cathode through the electrolyte when the secondary battery is being discharged, i.e., used for its specific application. During the discharge process, electrons are collected from the anode and pass to the cathode through an external circuit. When the secondary battery is being charged or recharged, the lithium ions are transferred from the cathode to the anode through the electrolyte.

Historically, secondary lithium batteries were produced using non-lithiated compounds having high specific capacities such as $TiS_2$, MoS2, $MnO_2$ and $V_2O_5$, as the cathode active materials. These cathode active materials were coupled with a lithium metal anode. When the secondary battery was discharged, lithium ions were transferred from the lithium metal anode to the cathode through the electrolyte. Unfortunately, upon cycling, the lithium metal developed dendrites that ultimately caused unsafe conditions in the battery. As a result, the production of these types of secondary batteries was stopped in the early 1990's in favor of lithium-ion batteries.

Lithium-ion batteries typically use lithium metal oxides such as $LiCoO_2$ and $LiNiO_2$ as cathode active materials coupled with a carbon-based anode. In these batteries, the lithium dendrite formation on the anode is avoided, thereby making the batteries safer. However, the lithium, the "usable" amount of which determines the battery capacity, is totally supplied from the cathode. This limits the choice of cathode active materials because the active materials must contain removable lithium. Also, delithiated products formed during charging and overcharging tend to be unstable. In particular, these delithiated products tend to react with the electrolyte and generate heat, which raises safety concerns.

Furthermore, new lithium-ion cells or batteries are initially in a discharged state. During the first charge of lithium-ion cell, lithium moves from the cathode material, such as $LiCoO_2$ or $LiNiO_2$, to the anode material, such as graphite. A passivation film that forms on the anode is called a solid electrolyte interface or SEI. The SEI film is due to electrochemical reduction of species present in the electrolyte on the electrode surface. Upon subsequent discharge, the lithium consumed by the formation of the SEI is not returned to the cathode. This results in a lithium-ion cell having a smaller capacity compared to the initial charge capacity because some of the lithium has been consumed by the formation of the SEI. The irreversible consumption of the available lithium reduces the capacity of the lithium-ion cell. This phenomenon is called irreversible capacity and is known to consume about 10% to 20% of the capacity of a conventional lithium ion cell. Thus, after the initial charge of a lithium-ion cell, the lithium-ion cell loses about 10% to 20% of its capacity.

One solution has been to use stabilized lithium metal powder ("SLMP®") to pre-lithiate the anode. For example, lithium powder can be stabilized by passivating the metal powder surface with $CO_2$ such as described in U.S. Pat. Nos. 5,567,474, 5,776,369, and 5,976,403, the disclosures of which are incorporated herein in their entireties by reference. The $CO_2$ passivated lithium metal powder, however, can be used only in air with low moisture levels for a limited period of time before the lithium metal content decays because of the reaction of the lithium metal and air. Another solution is to apply a fluorinated coating to the lithium metal powder such as described in U.S. Pat. No. 7,588,623, the disclosure of which is incorporated by reference in its entirety. Another solution is providing a wax layer such as described in U.S. Publication No. 2009/0035663A1, the disclosure of which is incorporated by reference in its entirety. There; however, remains a need for improved methods for applying the lithium metal powder to various substrates for forming the battery.

SUMMARY OF THE INVENTION

The present invention provides a method of finely depositing lithium metal powder or thin lithium powder derived foil onto a substrate while avoiding the use of a solvent. The method comprises depositing lithium metal powder onto a carrier, contacting the carrier with a substrate having a higher affinity for the lithium metal powder as compared to the affinity of the carrier for the lithium metal powder, subjecting the substrate while in contact with the carrier to conditions sufficient to transfer the lithium metal powder deposited on the carrier to the substrate, and separating the carrier and substrate so as to maintain the lithium metal powder finely deposited on the substrate. Optionally, a thin lithium powder derived foil can be used in place of the lithium metal powder. A battery including a substrate formed using such a method is also provided.

BRIEF DESCRIPTION OF THE DRAWINGS

The above objects and advantages of the present invention will become more apparent by describing in detail embodiments of the present invention with reference to the attached drawings in which.

DETAILED DESCRIPTION OF THE INVENTION

Figure 1:
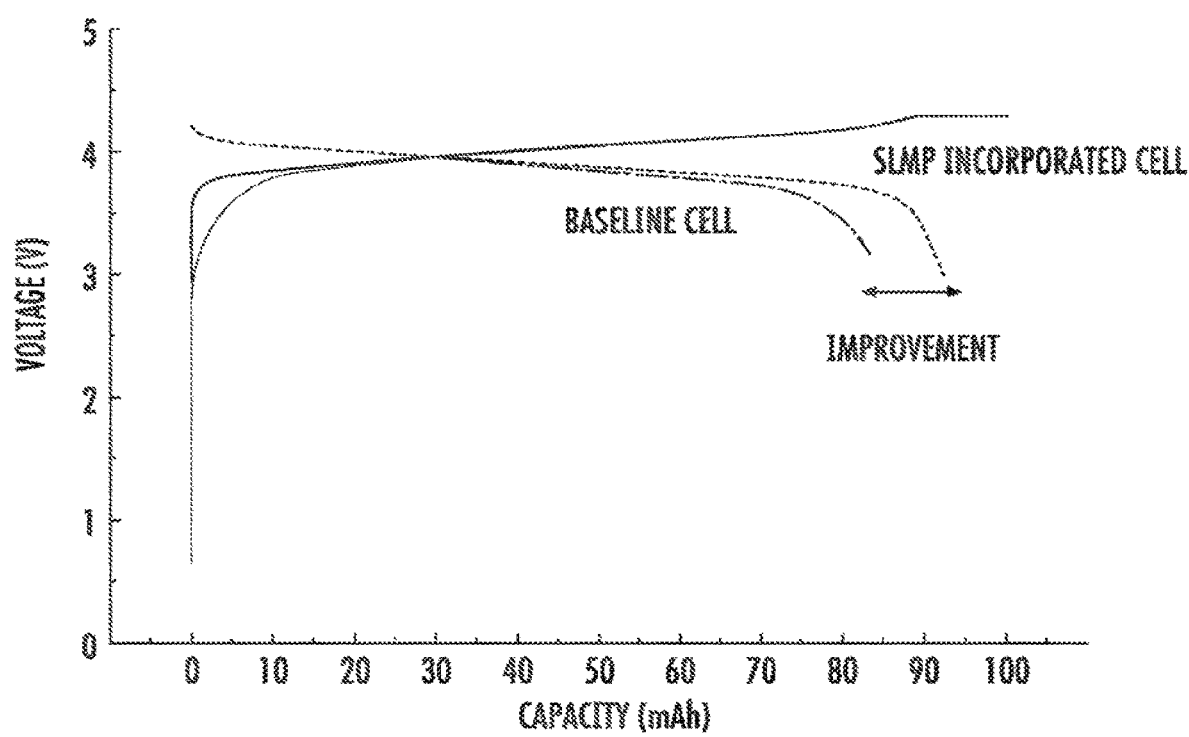
FIG. 1 is a first cycle voltage curve corresponding to Example 7.

The terminology used herein is for the purpose of describing particular embodiments only and is not intended to be limiting of the invention. As used herein, the term "and/or" includes any and all combinations of one or more of the associated listed items. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with the present invention, lithium metal powder is finely deposited onto a substrate without the use of a solvent. The lithium metal powder is in the form of a finely divided powder. The lithium metal powder typically has a mean particle size of less than about 60 microns, and often less than about 40 microns. The lithium metal powder may be in the form of a stabilized lithium metal powder ("SLMP®") such as described, for example, in U.S. Pat. Nos. 5,976,403 and 6,706,447, the disclosures of which are incorporated herein by reference in their entireties.

If a thin lithium powder derived lithium foil is used it will have a thickness of about 20 microns or less.

The lithium metal powder is initially deposited onto a carrier. The carrier may be a synthetic or semi-synthetic amorphous solid resin, cellulosic, glass, metallic (e.g., a metal foil) or a separator material (e.g., polypropylene, polyethylene or a laminate of the two). For example, the exemplary solid resins include polypropylene (e.g., InteTopp™ Type AA film), polyethylene, or polyester films. Exemplary metallic carriers include Cu or Cu alloy foil. In one embodiment, the surface of the carrier may include various additives to improve performance, reduce cost or to alter the affinity of the carrier for the lithium metal powder. The carrier may be in the form of a film, foil, mesh, or the like. The carrier often has a thickness of 10 microns to 200 microns. The purpose of the carrier is to deposit or transfer the lithium metal powder onto a substrate. The carrier has an affinity for the lithium metal powder; however, its affinity is less than that for the substrate on which the lithium metal powder is to be deposited. If a lithium powder derived thin lithium foil is used it can be applied or deposited using the same procedure as for the lithium powder transfer with the appropriate pressure applied. Alternatively, a binder such as EVA, SBR, wax, etc. may be applied to a carrier. SLMP® may then be electrostatically deposited on the carrier.

The lithium metal powder may be deposited onto the carrier via sieving, spraying, coating, printing, painting, dipping, and the like, the selection of which will be within the skill of one in the art. It also could be deposited using high pressure vapor flow technology, gas flow technology and the like that allows very high rate of deposition and solvent free deposition using mechanical forces.

The substrate has a higher affinity for the lithium metal powder as compared to the affinity of the carrier for the lithium metal powder. Suitable substrates may include carbonaceous materials, $Li_4Ti_5O_{12}$ and other lithium insertion material, Si, Sn, Cu, SiO, tin oxides, tin alloys, transition metal alloys, lithium metal nitrides, and lithium metal oxides, and mixtures, and composites thereof as well as Cu foils and other metal alloys. The substrate may be treated or contacted with an agent to promote affinity of the lithium metal powder for the substrate. Suitable affinity promoting agents include polymer binders such as ethylene vinyl acetate, styrene butadiene rubber, butadiene rubber, and ethylene propylene diene monomer, natural waxes, such as 12-hydroxystearie acid, synthetic waxes such as low molecular weight polyethylene, petroleum waxes such as paraffin wax, and microcrystalline waxes.

In operation, the carrier is typically pressed onto the substrate under pressure such as 100 to 20,000 psi. By using the affinity of the lithium metal powder, a discontinuous layer of the lithium metal powder is provided on the substrate. Additionally the lithium metal powder will be deformed during its deposition.

The substrate may be in the form of a surface of an electrode. After the lithium metal powder is deposited, the carrier and substrate may be separated in a manner sufficient to maintain the lithium metal powder on the substrate.

The substrate may be used in a wide variety of applications wherein the properties of the lithium metal powder are desired. For example, the substrate may be formed into an anode for a secondary battery such as described in U.S. Pat. No. 6,706,447, the disclosure of which is incorporated by reference in its entirety. A typical secondary battery comprises a positive electrode or cathode, a negative electrode or anode, a separator for separating the positive electrode and the negative electrode, and an electrolyte in electrochemical communication with the positive electrode and the negative electrode. The secondary battery also includes a current collector that is in electrical contact with the cathode and a current collector that is in electrical contact with the anode. The current collectors are in electrical contact with one another through an external circuit. The secondary battery can have any construction known in the art such as a "jelly roll" or stacked construction.

The cathode is formed of an active material, which is typically combined with a carbonaceous material and a binder polymer. The active material used in the cathode is preferably a material that can be lithiated at a useful voltage (e.g., 2.0 to 5.0 V versus lithium). Preferably, non-lithiated materials such as $MnO_2$, V205 MoS2, metal fluorides or mixtures thereof, can be used as the active material, and more preferably, $MnO_2$ is used. However, lithiated materials such as $LiMn_2O_4$ that can be further lithiated can also be used. The non-lithiated active materials are preferred because they generally have higher specific capacities, lower cost and broader choice than the lithiated active materials in this construction, and thus can provide increased power over secondary batteries that include lithiated active materials. Furthermore, because the anode includes lithium as discussed below, it is not necessary that the cathode include a lithiated material for the secondary battery to operate. The amount of active material provided in the cathode is preferably sufficient to accept the removable lithium metal present in the anode.

The anode formed from such a substrate is capable of absorbing and desorbing lithium in an electrochemical system.

Other potential uses of the substrate include current collector for primary batteries, high density polypropylene surfaces that could be used in fabricating of neutron detector parts.

The following examples are merely illustrative of the invention, and are not limiting thereon.

EXAMPLES

Example 1

12 mg of SLMP® was deposited on to a polypropylene InteTopp™ Type AA film of 50 cm² area. The SLMP carrier film was then lightly rolled using a polypropylene jewelers roller in order to adhere the particles to the film. The carrier film was then placed into the contact with a carbonaceous battery electrode of 50 cm² area. The carrier film and electrode stack was then pressed at 1500 lbs. Following pressing, the film was peeled away from the electrode depositing about 8 mg of lithium (about 0.16 mg/cm²).

Example 2

100 mg of SLMP was deposited onto a polypropylene InteTopp™ Type AA film of 284 cm² area. The SLMP carrier film was then lightly rolled using a polypropylene jewelers roller in order to adhere the particles to the film. The carrier film was then placed into contact with a carbonaceous battery electrode of 284 cm² area. The carrier film and electrode stack was then pressed using a hand roller. Following pressing the film was peeled away from the electrode depositing about 80 mg of lithium (about 0.4 mg/cm²).

Example 3

SLMP is sprayed onto polypropylene InteTopp™ Type AA film containing an EVA adhesion promoting agent. The carrier film is then placed into contact with a negative battery electrode. The carrier film and electrode stack is then pressed. Following pressing the film is peeled away from the electrode depositing a thin lithium foil layer onto the negative electrode.

Example 4

SLMP with an EVA adhesion promoting coating is sprayed onto polypropylene InteTopp™ Type AA film. The carrier film is then placed into contact with a negative battery electrode. The carrier film and electrode stack is then pressed. Following pressing the film is peeled away from the electrode depositing a thin lithium foil layer onto the negative electrode.

Example 5

100 mg of SLMP was deposited by a styrene-butadiene/BYK-P 104S in toluene in a ratio of SLMP:SBR:BYK of 100:10:5 slurry onto a corona-treated side of polypropylene film InteTopp™ Type BA plastic film of 249 cm² area. After solvent evaporation the carrier film was placed into contact with copper foil. The carrier film and copper foil stack was then calendered. Following calendering the polypropylene film was peeled away from the copper foil depositing a 26 mm layer of thin lithium foil.

Example 6

48 mg of SLMP was deposited by a styrene-butadiene/BYK slurry in toluene onto a corona treated side of polypropylene film InteTopp™ Type BA plastic film of 249 cm² area. After solvent evaporation the carrier film was placed into contact with an MCMB-25-28 (90%)+carbon black (3%)+PVdF (7%) electrode of 249 cm². The carrier film and electrode stack was then calendered. Following calendering the polypropylene film was peeled away from the electrode depositing a 47 mg layer of thin lithium foil.

Example 7

5 mg of SLMP was deposited by a styrene-butadiene/BYK slurry in toluene onto a corona-treated side of polypropylene film InteTopp™ Type BA plastic film of 49 cm² area. After solvent evaporation the carrier film was placed into contact with an MCMB-25-28 (90%)+carbon black (3%)+PVdF (7%) electrode of 49 cm². The carrier film and electrode stack was then calendered. Following calendering the polypropylene film was peeled away from the electrode depositing a layer of thin lithium foil. The MBMB 2528 electrode was then assembled into a pouch cell versus $LiMn_2O_4$ (90%)+carbon black (5%)+PVdF (5%) positive electrode. 1M $LiPF_6$/EC+DEC (1:1) from Novolyte was used as the electrolyte. Baseline cells of the same configuration containing no SLMP were assembled for comparison. After assembly the pouch cells were tested on a Maccor series 4000 cycler. The test procedure used was CC 12 mA to 4.3V, CV (constant voltage) to step time equals 10 hours. CC (constant current) discharge at 12 mA to 3.0 V. Prior to starting the cycle procedure the cells were allowed to rest for 5 hrs to allow time for the pre-lithiation process to be completed. The Table 1 below summarizes baseline and SLMP-incorporated cell data for Example 7. FIG. 1 shows the first cycle voltage curve for representative baseline and SLMP-incorporated cells.

TABLE 1

Pouch Cell First Cycle Efficient

| Cell ID | 1st Charge Capacity (mAh) | 1st Discharge Capacity (mAh) | Coulombic Efficiency (%) |
|---|---|---|---|
| SLMP-1 | 91.45 | 84.46 | 92 |
| SLMP-2 | 90.68 | 82.30 | 91 |
| Baseline-1 | 92.94 | 77.84 | 84 |
| Baseline-2 | 91.54 | 73.84 | 81 |

Example 8

Figure 2:
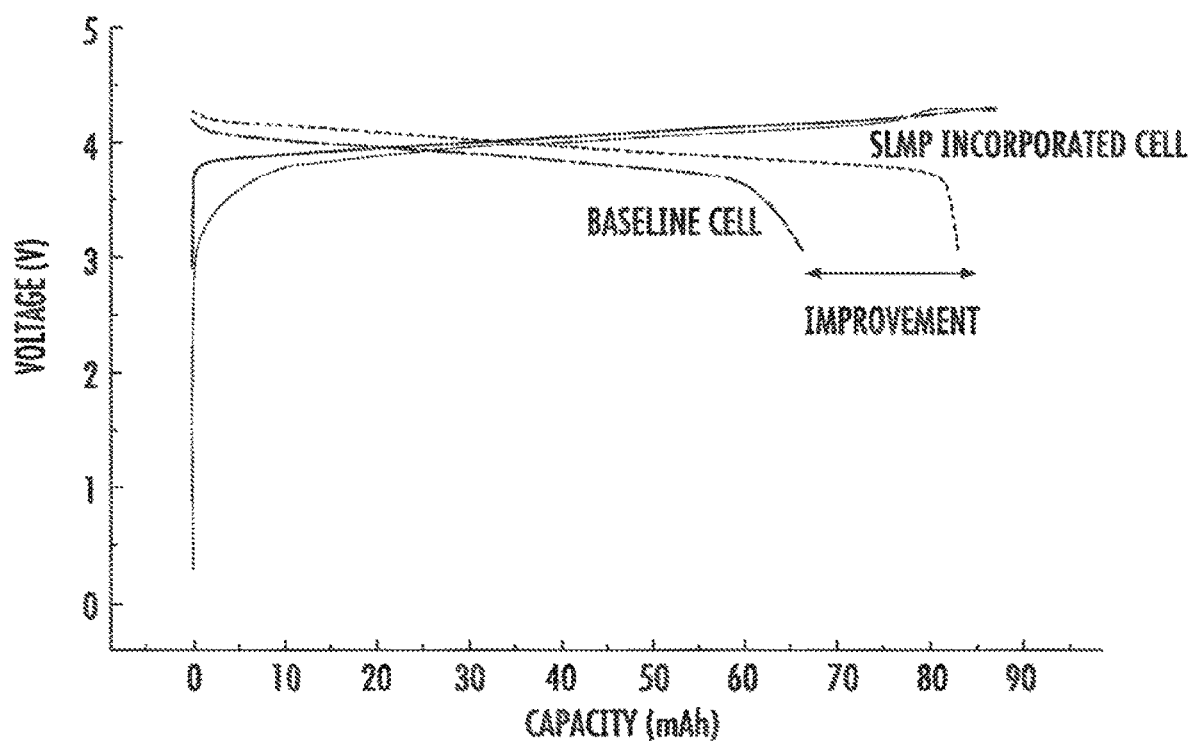
FIG. 2 is a first cycle voltage curve corresponding to Example 8.

5 mg of SLMP was deposited by a styrene-butadiene/BYK slurry in toluene onto Celgard® 3501 separator of 64 cm² area. After solvent evaporation the separator was placed into contact with an MCMB-2528 (90%)+carbon black (3%)+PVdF (7%) electrode of 49 cm². The separator and electrode stack was then calendered. Following calendaring the MCMB 2528 electrode and separator were assembled into a pouch cell versus $LiMn_2O_4$ (90%)+carbon black (5%)+PVdF (5%) positive electrode. 1M $LiPF_6$/EC+DEC (1:1) from Novolyte was used as the electrolyte. Baseline cells of the same configuration containing no SLMP were assembled for comparison. After assembly the pouch cells were tested on a Maccor series 4000 cycler. The test procedure used was CC 12 mA to 4.3V, CV to step time equals 10 hours. CC discharge at 12 mA to 3.0 V. Prior to starting the cycle procedure the cells were allowed to rest for 5 hrs to allow time for the pre-lithiation process to be completed. FIG. 2 shows baseline and SLMP incorporated cell first cycle voltage curves.

Example 9

100 mg of SLMP was deposited by a styrene-butadiene/BYK slurry in toluene onto 249 $cm^2$ area copper foil. After solvent evaporation the copper foil was calendered creating a 26 mm layer of thin lithium foil on the Cu foil. Copper current collector plus thin lithium foil can then be used as the negative electrode in a battery.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A method of depositing lithium metal powder onto a substrate without the use of a solvent, said method consisting essentially of the steps of:
    a) depositing stabilized lithium metal powder onto a carrier to form a single layer;
    b) adhering the single layer of stabilized lithium metal powder onto the carrier;
    c) contacting the carrier with a substrate;
    d) transferring the single layer, of stabilized lithium metal powder adhered onto the carrier to a substrate; and
    e) separating the carrier and substrate so as to maintain the single layer of stabilized lithium metal powder transferred to the substrate.

* * * * *